(12) United States Patent
Schmidt (10) Patent No.: US 11,472,466 B2
(45) Date of Patent: Oct. 18, 2022

(54) STEERING SHAFT FOR A MOTOR VEHICLE (71) Applicants: THYSSENKRUPP PRESTA AG, Eschen (LI); thyssenkrupp AG, Essen (DE)

(72) Inventor: René Marco Schmidt, Lienz (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 322 days.

(21) Appl. No.: 16/615,896

(22) PCT Filed: May 25, 2018

(86) PCT No.: PCT/EP2018/063805
§ 371 (c)(1),
(2) Date: Nov. 22, 2019

(87) PCT Pub. No.: WO2018/219817
PCT Pub. Date: Dec. 6, 2018

(65) Prior Publication Data
US 2020/0156693 A1    May 21, 2020

(30) Foreign Application Priority Data
May 31, 2017 (DE) ...................... 10 2017 209 167.3

(51) Int. Cl.
*B62D 1/20* (2006.01)
*F16C 3/035* (2006.01)
(Continued)

(52) U.S. Cl.
CPC ................ *B62D 1/20* (2013.01); *F16C 3/035* (2013.01); *F16C 19/04* (2013.01); *F16C 29/04* (2013.01);
(Continued)

(58) Field of Classification Search
CPC ... B62D 1/20; B62D 1/16; F16C 3/035; F16C 19/04; F16C 29/04; F16C 33/3831; F16C 29/046; F16D 3/065
(Continued)

(56) References Cited

U.S. PATENT DOCUMENTS 4,201,424 A * 5/1980 Ernst ..................... F16C 29/069
464/167
6,893,353 B2 * 5/2005 Dutkiewicz ............. F16C 3/035
464/167
(Continued)

FOREIGN PATENT DOCUMENTS

CN    1646358 A    7/2005
CN    1747867 A    3/2006
(Continued)

OTHER PUBLICATIONS

English Translation of International Search Report issued in PCT/EP2018/063805, dated Aug. 29, 2018 (mailed Sep. 6, 2018).

*Primary Examiner* — Greg Binda
(74) *Attorney, Agent, or Firm* — thyssenkrupp North America, LLC (57) ABSTRACT

A steering shaft may include a hollow shaft in which an inner shaft is arranged telescopically coaxially in an axial direction. A rolling body may be held in a form fit manner in a circumferential direction and configured to roll in the axial direction in a rolling body holding element of a rolling body cage disposed between the inner and hollow shafts, which is arranged in the axial direction between radially projecting stop elements of the hollow shaft and of the inner shaft. The rolling body cage may have end-face axial support surfaces that are oriented in the axial direction against the stop elements. The rolling body cage may have (Continued)

Section A-A at least one transfer element extending axially between the end-face axial support surfaces.

16 Claims, 5 Drawing Sheets

(51) Int. Cl.
*F16C 19/04* (2006.01)
*F16C 33/38* (2006.01)
*F16C 29/04* (2006.01)
*F16D 3/06* (2006.01)
*B62D 1/16* (2006.01)

(52) U.S. Cl.
CPC ............ *F16C 33/3831* (2013.01); *B62D 1/16* (2013.01); *F16C 29/046* (2013.01); *F16D 3/065* (2013.01)

(58) Field of Classification Search
USPC ............................................ 464/167; 384/51
See application file for complete search history.

(56) References Cited

U.S. PATENT DOCUMENTS

| | | | |
|---|---|---|---|
| 7,922,592 B2 * | 4/2011 | Erlmann | F16C 3/035 464/167 |
| 10,619,666 B2 * | 4/2020 | Muntener | F16C 29/04 |
| 11,001,293 B2 * | 5/2021 | Schmidt | B62D 1/20 |
| 2006/0048597 A1 | 3/2006 | Heiml | |
| 2011/0088502 A1 | 4/2011 | Brown | |

FOREIGN PATENT DOCUMENTS

| | | | | |
|---|---|---|---|---|
| CN | 202847786 U | 4/2013 | | |
| CN | 103388620 A | 11/2013 | | |
| CN | 105587750 A | 5/2016 | | |
| CN | 105730497 A | 7/2016 | | |
| CN | 205937436 U | 2/2017 | | |
| DE | 37 30 393 A1 * | 3/1989 | | 464/167 |
| DE | 10 2007 027 767 A | 12/2008 | | |
| DE | 10 2014 017 407 A | 6/2016 | | |
| DE | 10 2014 017 555 A | 6/2016 | | |
| DE | 10 2015 102 183 A | 8/2016 | | |
| DE | 10 2016 224 271 A | 2/2017 | | |
| KR | 10 2013 0 036 411 A | 4/2013 | | |
| WO | 2017/001308 A | 1/2017 | | |

* cited by examiner

Section A-A

Section B-B

STEERING SHAFT FOR A MOTOR VEHICLE

CROSS REFERENCE TO RELATED APPLICATIONS

This application is a U.S. National Stage Entry of International Patent Application Serial Number PCT/EP2018/063805, filed May 25, 2018 which claims priority to German Patent Application No. DE 10 2017 209 167.3, filed May 31, 2017, the entire contents of both of which are incorporated herein by reference.

FIELD

The present disclosure generally relates to steering shafts, including telescopic steering shafts for motor vehicles.

BACKGROUND

The use of a steering shaft which is telescopic in its axial direction in a motor vehicle allows an adjusting of the steering column in order to adjust the steering wheel position in the longitudinal direction. Furthermore, the steering shaft in the event of a crash can be pushed together in the direction of its longitudinal axis, thereby effectively preventing the steering shaft from penetrating into the passenger compartment and causing injuries to the occupants. This is accomplished by two mutually telescopic shafts, namely a hollow shaft, which is formed as the outer shaft by a tubular hollow profile, and an inner shaft, which is mounted telescopically therein, i.e., coaxially and axially movable, in the direction of the longitudinal axis (axial direction) of the steering shaft, with the steering wheel mounted on its rear end in regard to the direction of travel. Thanks to the telescopic pushing together or pulling apart of inner shaft and hollow shaft, the steering shaft can be shortened or lengthened.

In this kind of design, at least one and generally multiple rolling bodies are arranged between the hollow shaft and the inner shaft. The rolling bodies can roll between the outer surface of the inner shaft and the inner surface of the hollow shaft in the direction of the longitudinal axis, so that a smooth rolling body-mounted axial adjustability of the inner shaft relative to the hollow shaft is realized. For the transmission of the torque applied for the steering, the inner shaft has on its outside and the hollow shaft has on its inside mutually radially opposite groovelike rolling body running tracks extending in the direction of the longitudinal axis, between which the rolling bodies are arranged, and serving as form-fit elements to form a form fit acting with regard to a rotation about the longitudinal axis, joining together the hollow and the inner shaft with torque locking. Therefore, such steering shafts are also known as roll sliding shafts.

The rolling bodies are received in a rolling body holding element of the rolling body cage and can turn freely about their rolling axes, as is described for example in DE 10 2014 017 555 A1, being thereby guided and held in position relative to each other between the shafts, especially with an axial spacing. The rolling body holding element comprises at least one and generally multiple rolling body holders, such as ball holding openings.

In normal operation, a steering column can be moved in a controlled manner within the designed adjustment path in order to adjust the steering wheel position. In order to make sure that the steering shaft cannot be pulled apart in the lengthwise direction beyond the maximum travel path, for example by incorrect manipulation or also during a repair of the vehicle, such that the inner shaft is pulled out entirely from the hollow shaft and thereby separated from the outer shaft, it is known how to provide a pull-out safety feature in the form of a pull-out limiting device, which limits the travel path of the telescopic movement and prevents a separating of inner and outer shaft. For a safety-relevant component such as a steering column, such an unintentional disassembly resulting in separation of the steering train must be safely prevented in any case.

The pull-out safety feature known from DE 10 2014 017 555 A1 comprises a first stop element, which is mounted at the open end of the outer shaft, into which the inner shaft plunges, and projecting radially inward, and a second stop element, which is arranged at the end of the inner shaft plunging into the outer shaft and projecting radially outward. The stop elements have axial stop surfaces facing opposite each other in the gap between outer and inner shaft, between which the rolling body cage is located. The rolling body cage has end-face support surfaces on both axial ends, axially facing the stop surfaces. The maximum pull-out is limited by the end stop of the pull-out limiter, with the stop elements axially striking against the support surfaces of the rolling body cage at both ends. In this way, the roller bearing cage absorbs the tensile force exerted during the pull-out as an axial compressive force thanks to the support surfaces. Large pull-out forces, i.e. forces in the axial direction pulling the steering shaft apart due to misuse or accidental use, act accordingly as a large loading on the roller bearing cage, which may lead to unwanted deformations or damage, especially also to the rolling body holding element, which may impair the functional capability of the adjustment.

Thus a need exists for an improved steering shaft that can better absorb high pull-out forces and that has better operating reliability, as well as an improved rolling body cage.

SUMMARY

According to the present disclosure, a rolling body cage of a steering shaft may have at least one transfer element extending axially between support surfaces.

In the end stop at maximum pull-out of the steering shaft, the pull-out force acting as tension in the pull-out direction between outer and inner shaft is diverted via the stop elements into the support surfaces of the rolling body cage, which are braced axially against them. In this case, the transfer element according to the invention which joins together the support surfaces in an axially rigid manner is subjected to the pull-out force as a compression, and it transfers the applied compressive force between the stop elements of the hollow shaft and the stop elements of the inner shaft.

The transfer element is arranged as a force transfer element parallel to the rolling body holding element, and in the end stop it intercepts the pull-out force acting on the rolling body cage. The flow of the pull-out force between the inner shaft and the hollow shaft when these are in the fully pulled-out position thus occurs, not as in the prior art via the rolling body holding element, but through the transfer element. In this way, the rolling body holding element is shielded and protected against the action of the pull-out force, so that even under extremely high peak loading no damaging deformation will occur, such as might lead in the prior art to a locking of the rolling bodies in the rolling body holders, for example. Also prevented are damage or removal of the rolling bodies, which may result in a hindering or blocking of the telescopic adjustability, which may make it difficult for the steering column to be pushed together in the event of a crash, thus impairing the safety.

A rolling body cage configured according to the invention is not vulnerable to high loading exerted by misuse or unintentional operation. This enhances the operating reliability of the steering shaft and thus the steering column and the level of safety of the vehicle passengers.

The transfer element according to the invention is pressure-resistant and rigid in the axial direction, and it extends over the axial length of the rolling body cage. Preferably, the transfer element is harder and/or more rigid and/or stronger with regard to compressive stress than a rolling body holding element. If the rolling body cage comprises multiple rolling body holding elements and/or multiple transfer elements, the hardness, rigidity and/or strength of the transfer elements at least in totality is greater than that of the rolling body holding elements. In particular, the hardness, rigidity and/or strength of the transfer element or elements is chosen to be large enough that the shape stability with respect to mechanical stress is increased and even under the largest anticipated peak loading of the pull-out force no significant deformation of the rolling body cage will occur, harmful to its function, and in particular a plastic deformation is prevented.

In one advantageous modification it may be proposed that the transfer element is longer in the axial direction than the rolling body holding element. In this way, even through the transfer element stands in contact with the stop elements of the hollow shaft and the stop elements of the inner shaft via the support surfaces, the rolling body holding elements are not loaded and it does not make contact with respective stop elements even when extreme loads are acting, which might cause an elastic deformation of the transfer elements in the axial direction.

Alternatively or additionally, in order to increase the rigidity, the transfer element may have a material thickening. In the region of the material thickening, the cross section may be enlarged in the radial direction, so that a lengthwise profiled rib is formed, at the end faces of which the support surfaces are located. Furthermore, the transfer element may be configured by the material thickening as a form-fit element, which can join together the inner and the hollow shaft by form fit in regard to rotation about the axis. The dimensions may be adapted such that the material thickening in the normal operating condition, when the steering torque is transmitted by the form fit through the rolling bodies, is in the loose form fit between inner and hollow shaft. But if the rolling bodies are lost, the transfer element engages with form fit, so that the steering shaft remains functional in an emergency. Thanks to the supplemental function of the transfer element according to the invention as a redundant form-fit element, the safety level of the steering column is further enhanced.

The material of the transfer element can be a metallic material. A metallic material provides good loading ability and shape rigidity for a relatively small material cross section, so that a roller bearing cage according to the invention can be accommodated with no problem in the available design space between the inner and the hollow shaft. For example, the transfer element can be made of steel, such as a high-strength and efficiently produced massive shaped piece, or as a sintered piece made of a metallic sintering material, or as a die-cast component made of Zamak or the like.

The rolling body holding element may be formed as an injection-molded plastic part. The fabrication in plastic injection molding is rational and enables an optimized shaping of the rolling body holders, in order to position and hold securely the rolling bodies and at the same time mount them with easy rotation. The plastic chosen may be a thermoplastic polymer with suitable properties, such as those in regard to strength and sliding properties. Due to the fact that the compressive stiffness is provided by the transfer element according to the invention and the rolling body holding element is relieved of load, an easily worked plastic material can be used, and the rolling body holding element can have a functionally optimized, slender shape, having a relatively slight shape rigidity in regard to compressive loading. This results in greater design freedom than in the prior art. For example, multiple rolling body holding elements can be provided in the form of a single injection-molded piece.

Because the rolling body holding element and the transfer element are designed independently of each other in terms of shape and material and are joined together in order to form the rolling body cage, an optimized adapting to the respective function can be obtained.

The rolling body cage may be sleeve shaped, with a cross section enclosing the inner shaft at least for a portion. For example, the rolling body cage may have a hollow cylindrical tube segment shape, or a hollow profile shape with nonround or polygonal cross section. The support surfaces are then located on the end faces at both ends of the hollow profile.

Alternatively, the rolling body cage can be segmented in the circumferential direction, forming one or more rail-like rolling body cage segments, each of which comprises at least one rolling body holding element or a transfer element according to the invention, especially preferably at least one rolling body holding element and one transfer element.

At least one, preferably a plurality of such transfer elements can be arranged in the circumferential direction adjacent to a rolling body holding element. Thanks to this association, the rolling body holding element is well shielded and protected against harmful force action and an applied axial bearing force is safely transmitted between the support surfaces. A plurality of rolling body holding elements and force transfer elements may be distributed around the circumference, preferably in an alternating manner.

In one advantageous embodiment it is possible for the transfer element and the rolling body holding element to be joined together by form fit and/or force locking and/or material bonding. The transfer element and the rolling body holding element can be individually devised and designed according to the anticipated stresses, and be fabricated and provided as separate elements which are joined together in a later fabrication to make a rolling body cage. In this way, transfer elements and rolling body holding elements consisting in particular of different materials can be combined with each other to form a functional unit, for example a rolling body holding element consisting of plastic can be combined with a metallic transfer element. For example, transfer and rolling body holding elements may have mutually corresponding form-fit elements which can engage with each other to form a form-fitting connection, such as form-fitting protrusions and recesses to create a form-fitting connection acting axially and/or radially in the circumferential direction. In this way, transfer and rolling body holding elements which are different in their properties can be fabricated separately and be combined with each other as needed to form a rolling body cage.

Alternatively or additionally, mutually corresponding force-locking elements can be provided, producing a force-locking or friction-locking connection, which is sufficient for example to join together the transfer and the rolling body holding elements easily as a manipulation-friendly unit for mounting in the steering shaft.

Alternatively or additionally, a materially bonded connection can be made between transfer element and rolling body holding element, for example by gluing or welding. If the rolling body holding element is made of a plastic, the especially advantageous manufacturing option exists of molding a rolling body holding element onto a transfer element in an injection molding process, or to overmold it entirely or partially, and to embed it at least partially in the plastic material. The materially bonded connection is created by bringing the molten plastic into contact with the transfer element during the injection molding, such that it adheres to the contact surfaces. Once the transfer element is enclosed by the plastic, it is inseparably form-fitted and materially bonded and embedded in the plastic body.

It may furthermore be provided that the transfer element comprises a reinforcement element. A reinforcement element can serve for strengthening the dimensional rigidity, such as a pressure-resistant element which is embedded in a less pressure-resistant material or connected to such a material. For example, it is conceivable to integrate a reinforcement lattice or fabric in a plastic body.

Preferably, the rolling body cage comprises at least one rolling body holding element, preferably multiple rolling body holding elements, and a plurality of transfer elements. According to the cross section geometry, there may be distributed two, three, four or more rows of rolling bodies around the circumference in rolling body holding elements, for example distributed around the circumference in fourfold symmetry, as in the above-cited prior art. Accordingly, each of the rolling body holding elements comprises a plurality of rolling body holders arranged in axial succession. It is advantageous for a transfer element to be arranged between adjacent rolling body holding elements in the circumferential direction. In this way, it is possible to employ respectively the same number of rolling body holding elements and force transfer elements, but depending on the maximum anticipated loading it is also possible to use more or fewer transfer elements according to the invention.

The invention encompasses a rolling body cage for a telescopic steering shaft, comprising at least one rolling body holder to hold at least one rolling body in a freely rotatable manner, and comprising axial support surfaces. According to the invention, a transfer element is arranged axially between the support surfaces.

The support surfaces are arranged at the end faces on both ends, so that the bearing force in the axial direction can be diverted as a compressive force into the rolling body cage. The rolling body holder is preferably formed in a rolling body holding element, which is designed as described above.

The rolling body cage according to the invention may expressly have individually or in combination all the features mentioned above in connection with the steering shaft according to the invention, but in particular not solely as regards the transfer element according to the invention.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering shafts for motor vehicles. In some examples, a steering shaft may include a hollow shaft in which an inner shaft is arranged telescopically coaxially in an axial direction. At least one rolling body may be held with form fit in a circumferential direction and able to roll in the axial direction in a rolling body holding element of a rolling body cage arranged between the inner shaft and the hollow shaft, which is arranged in the axial direction between radially projecting stop elements of the hollow shaft and radially projecting stop elements of the inner shaft. The rolling body cage may have end-face axial support surfaces that are oriented in the axial direction against the stop elements. The present disclosure also generally relates to a rolling body cage for a steering shaft.

Figure 1:
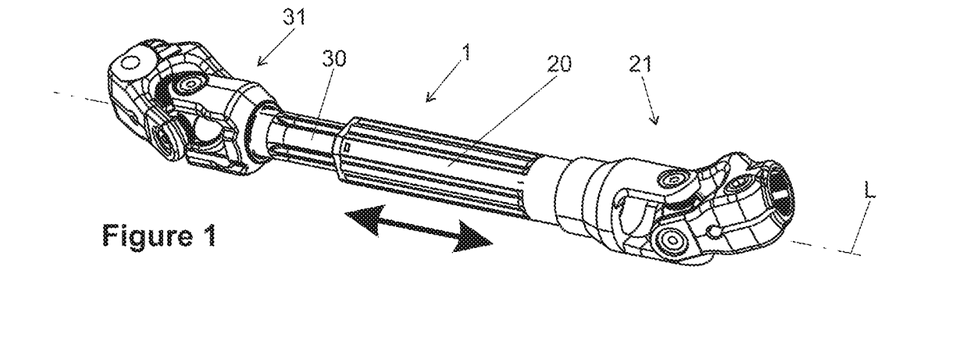
FIG. 1 is a schematic perspective view of an example steering shaft.

FIG. 1 shows in perspective view a schematically represented steering shaft 1, comprising a hollow shaft 20, also known as an outer shaft, and an inner shaft 30, which are mutually telescopic in the axial direction of the longitudinal axis L, i.e., in the axial or longitudinal direction indicated by the double arrow.

The hollow shaft 20 comprises at its free end, which is facing away from the inner shaft 30 in the longitudinal direction, a fork 21, which is part of a universal joint by which the steering shaft 1 is connected in torque-locking fashion to the steering train, not further shown. Accordingly, the inner shaft 30 has at its free end, which is facing away from the hollow shaft 20 in the longitudinal direction, a fork 31, which forms part of a further universal joint by which the steering shaft 1 is connected in torque-locking fashion to the steering train. The hollow shaft 20 is fabricated preferably as a hollow profile made from good cold-workable steel. The inner shaft 30 in the example shown is configured as a solid shaft. Alternatively, however, it may also be provided that the inner shaft 20 is configured as a hollow shaft.

Figure 2:
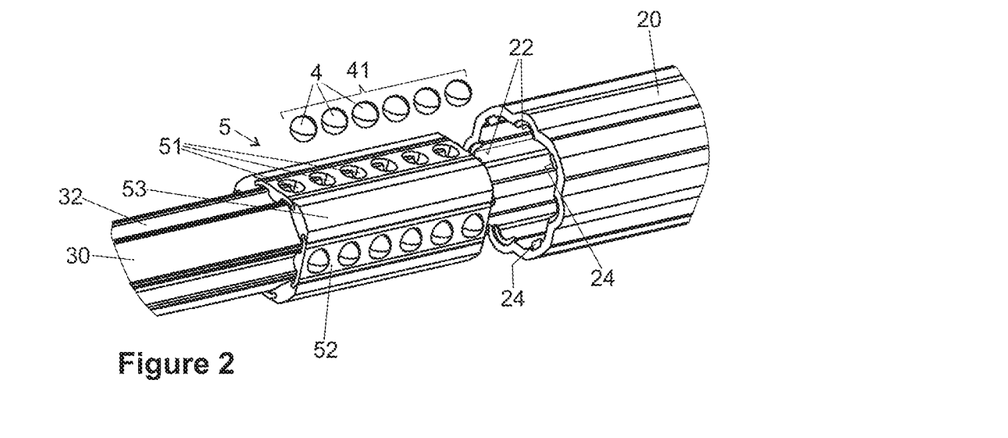
FIG. 2 is a partial view of the steering shaft according to FIG. 1 in a disassembled state.

FIG. 2 shows the steering shaft 1 of FIG. 1 in an exploded view, where the inner shaft 30 is shown pulled out from the hollow shaft 20 in the direction of the longitudinal axis L.

Figure 4:
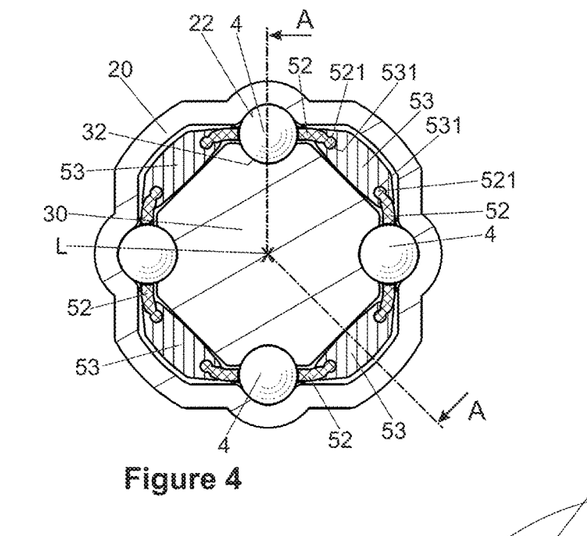
FIG. 4 is a cross-sectional view through the steering shaft according to FIG. 1.
Figure 5:
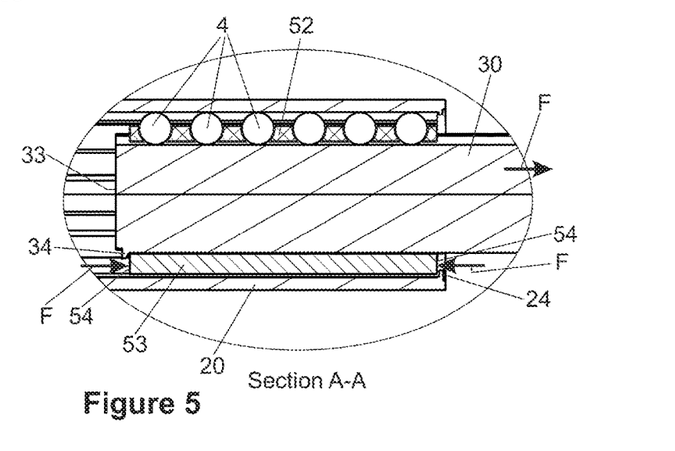
FIG. 5 is a longitudinal sectional view A-A through the steering shaft according to FIG. 1.
Figure 6:
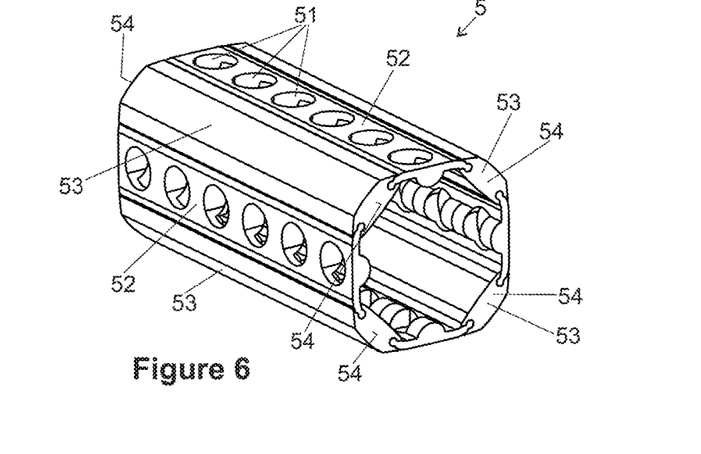
FIG. 6 is a schematic perspective view of a rolling body cage of the steering shaft according to FIG. 1.

Between the hollow shaft 20 and the inner shaft 30 there are arranged rolling bodies in the form of balls 4, as can be seen in the cross section of FIG. 4 and in the longitudinal section of FIG. 5.

The hollow shaft 20 has grooves 22 running in its inner surface in the longitudinal direction, and the inner shaft 30 has corresponding radially opposite grooves 32, serving as rolling body running tracks for the balls 4, i.e., forming ball running tracks. The balls 4 are arranged between these grooves 22 and 32 such that they can roll in them in the direction of the longitudinal axis L and thus form a linear roller bearing for an axial telescopic relative movement of the inner shaft 30 and the hollow shaft 20. Furthermore, the balls 4 serve as form-fit elements, which engage by form fitting in the grooves 22 and 32 regarding a relative rotation about the longitudinal axis L, thereby transmitting a torque introduced as a steering torque into the inner shaft 30 to the hollow shaft 20, or vice versa. In the example shown, four respective grooves 22 and 32 are distributed in the circumferential direction about the longitudinal axis L. The inner shaft 30 in the example shown is configured as a solid shaft. Alternatively, however, it is also conceivable and possible for the inner shaft 30 to be configured as a hollow shaft.

The balls 4 are held in a rolling body cage 5, which is configured as a ball cage. The roller bearing cage 5 comprises a rolling body holder 51 for each of the balls 4 in the form of a radially continuous opening, in which a ball 4 is held with play so as to turn freely about its ball center, and protruding radially inwardly and outwardly so that it can roll unhindered in the grooves 22 and 32 in the longitudinal direction.

Figure 3:
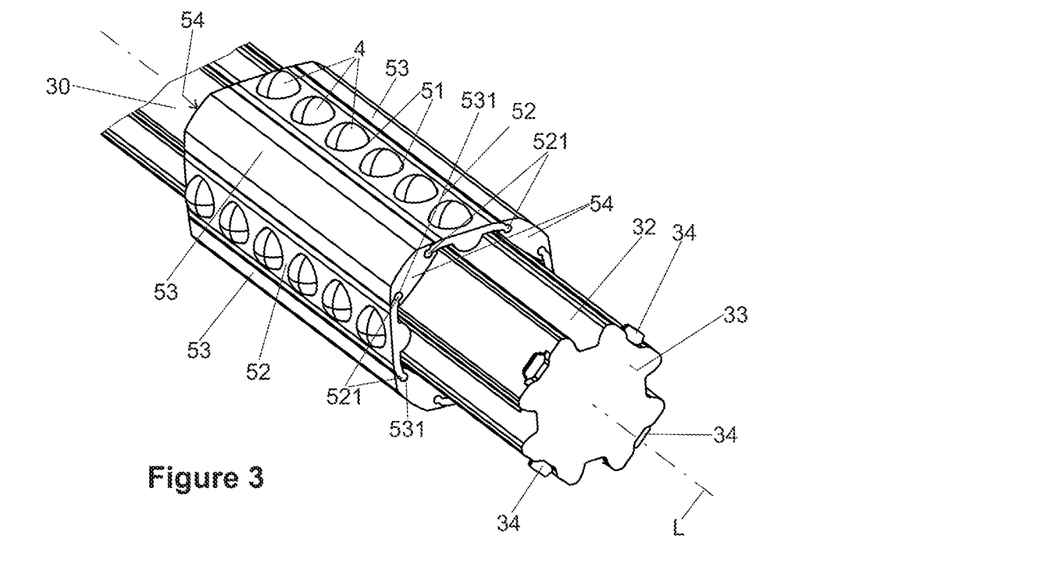
FIG. 3 is a partial view of an example inner shaft of the steering shaft according to FIG. 1 in a disassembled state.

The arrangement of the rolling body cage 5 with inserted balls 4 mounted on the inner shaft 30 is shown in FIG. 3, showing a perspective view of the free end 33 of the inner shaft 30, which in the assembled state of FIG. 1 plunges into the opening of the hollow shaft 20.

In each case a plurality of rolling body holders 51 is arranged with an axial spacing from each other in the longitudinal direction, so that the balls 4 held therein in each case form an axial row of balls 41, in the example shown consisting of six balls 4 in each case. The rolling body holders 51 for the balls 4 of one row of balls 41 are formed in each case in a rolling body holding element 52. In the circumferential direction, each of the four rolling body holding elements 52 shown in the example extends in the area of the grooves 22 and 32.

In the circumferential direction, transfer elements 53 according to the invention are arranged between the rolling body holding elements 52, the four rolling body holding elements 52 and likewise four transfer elements 53 being arranged alternately in the circumferential direction and joined together. Thanks to this arrangement, the rolling body cage 5 has the shape of a sleevelike hollow profile with octagonal cross section, whose side surfaces are formed alternately by rolling body holding elements 52 and transfer elements 53.

In the embodiment shown in FIGS. 3 to 6, the rolling body holding elements 52 comprise form-fit elements 521 and the transfer elements 53 comprise form-fit elements 531, which mesh together in form fitting. The form-fit elements 521 are formed as strip-like protrusions running in the longitudinal direction with an undercut head-shaped cross section, by which they can interlock by form fitting with the corresponding form-fit elements 531 in the transfer elements 53, formed as undercut grooves, in the circumferential direction. In addition or alternatively, the connection can be by material bonding, for example by gluing or ultrasonic welding.

The transfer elements 53 each have an axial support surface 54 on their two axial end faces. In other words, each of the transfer elements 53 extends between its support surfaces 54. At the one end face, facing toward the end 33, one of the support surfaces 54 lies opposite a respective stop element 34 in the axial direction, which projects radially outward from the inner shaft 30. Such a stop element 34 is formed for example by a plastically deformed region, such as a caulking, which protrudes into the gap between the inner shaft 30 and the hollow shaft 20, as is shown in the longitudinal section through the assembled steering shaft 1 in FIG. 5.

The support surfaces 54 on the other end face, which is facing away from the end 34, lie opposite a respective stop element 24 in the axial direction, which protrudes inwardly from the inside of the hollow shaft 20 radially into the gap between the inner shaft 30 and the hollow shaft 20. A stop element 24 can likewise be formed by a caulking, as shown, which comprises a plastically deformed region in the radial direction.

The stop elements 24 and 34 protrude into the gap between the hollow shaft 20 and the inner shaft 30 in which the transfer elements 53 move forward or back during an adjustment of the steering shaft 1 in the direction of the longitudinal axis L. When the steering shaft 1 is pulled apart, the stop elements 24 and 34 move toward each other until they come to lie against said support surfaces 54 on the rolling body cage 5 lying in between.

FIG. 4 shows a cross section through the steering shaft 1. This reveals the octagonal cross section in its basic form, with the grooves 22 and 32 distributed evenly around the circumference in every second side surface, between which are arranged the rolling body holding elements 52 with the balls 4. On the side surfaces lying in between in the circumference, the transfer elements 53 according to the invention are situated in the gap between the inner shaft 30 and the hollow shaft 20.

FIG. 5 shows in a cut-out view in the longitudinal section A-A of FIG. 4 the stop situation with the steering shaft 1 pulled out to the maximum. Here, a relative pull-out force F is acting on the hollow shaft 20 and the inner shaft 30. Thanks to the stop elements 34 and 24, this pull-out force F is transmitted as a compressive force to the support surfaces 54. The two oppositely directed force arrows indicate how the pull-out force F acts axially on the transfer element 53. The transfer element 53 is more loaded with compression in the longitudinal direction the larger the pull-out force F is.

In order to make sure that no harmful deformation of the rolling body holding elements 52 occurs due to large pull-out forces F, the transfer elements 53 according to the invention have a higher dimensional rigidity than the rolling body holding elements 52, especially in regard to an axial loading. For example, the transfer elements 53 can be made of steel, preferably as cold-worked parts, as sintered metallic parts, as die-cast parts or as injection-molded parts. Thanks to their relatively simple shape as a continuous profile segment in the longitudinal direction with constant cross section, a rational production as an endless semifabricated product is possible, from which transfer elements 53 are cut off in the length dictated by the rolling body cage 5. Thanks to the high strength and hardness, the transfer elements 53 made of metallic material even with relatively small material cross sections already withstand high compressive forces with no risk of plastic deformation.

The rolling body holding elements 52 are preferably formed as injection-molded plastic parts made from thermoplastic elastomer or thermoplastic material. In this way, a complex shaping can be realized with no problems in order to configure the rolling body holders 51, and a rational production is possible. The elastic plastic furthermore makes it possible for the rolling body holders 51 to be at least partly springlike elastic, for example with resilient holding elements, so that the balls 4 can be snapped in in a springlike fashion and are held captively in loose form fit, making the handling and assembly process easier. The form-fit elements 521 for connection to the transfer elements 53 may likewise be realized easily, for example as resilient latching elements with form fit locking.

Due to the relatively slender construction and the relatively soft plastic, the rolling body holding elements 52 can only absorb a slight force. This function is taken over by the transfer elements 53 according to the invention, so that the rolling body holding elements 52 remain essentially force-free even under large bearing forces. Accordingly, even under high peak loading there is no danger of impairing the function of the roller bearing cage 5.

The transfer elements 53 fill up the polygonal cross section of the gap between the hollow shaft 20 and the inner shaft 30 as can be seen in FIG. 4. In this way, they form form-fit elements with regard to a relative rotation of the hollow shaft 20 and the inner shaft 30, which are in a loose form fit in the operating condition shown, i.e., not lying, or at least not lying at the same time, against the hollow shaft 20 and the inner shaft 30. In an emergency, when balls 4 are damaged or have been removed from the grooves 22 and 32, the transfer elements 53 can take over the function as form-fit elements, making possible the transmitting of a steering torque. Thus, the transfer elements 53 can additionally provide a redundant torque transmission between the hollow shaft 20 and the inner shaft 30. For this additional function, it is likewise advantageous that the transfer elements are made from a dimensionally stiff, preferably metallic material, such as steel. In this way, the safety level of the steering shaft and thus of a steering column is heightened.

FIG. 6 shows yet again a rolling body cage 5 according to the preceding figures in an individual perspective representation without balls 4.

Figure 7:
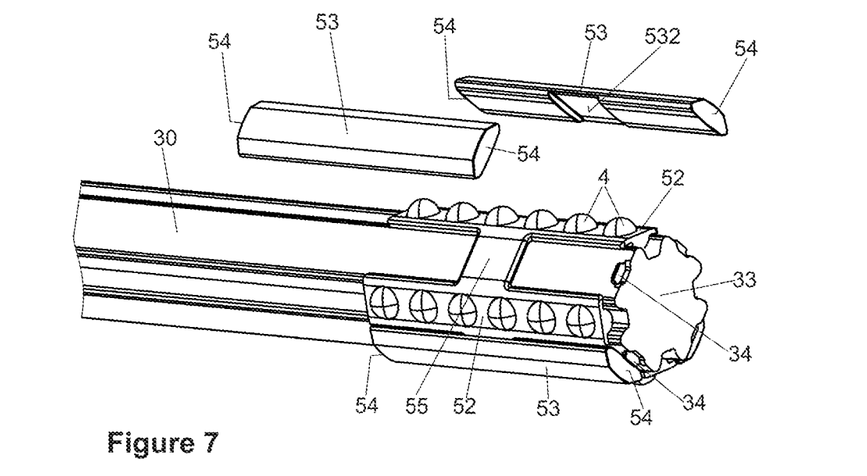
FIG. 7 is a perspective partial view of another example steering shaft.
Figure 8:
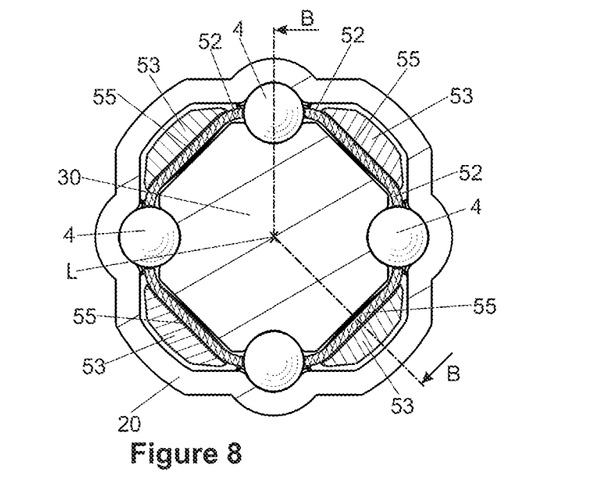
FIG. 8 is a cross-sectional view through the steering shaft according to FIG. 7.
Figure 9:
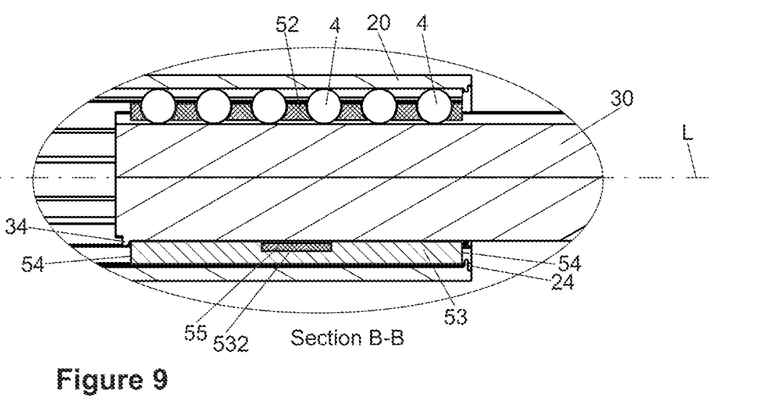
FIG. 9 is a longitudinal sectional view B-B through the steering shaft according to FIG. 7.

In FIGS. 7, 8 and 9 is shown a second embodiment of a steering shaft 1, in views corresponding to FIGS. 3, 4 and 5. FIG. 9 shows a section B-B according to FIG. 8.

The inner shaft 30 is configured the same as in the previous embodiment. The rolling body holding elements 52 are likewise configured identically, at least in regard to the arrangement of the balls 4. The rolling body holding elements 52 here are joined together by weblike connection elements 55 in ring fashion in the circumferential direction to form a sleevelike structure, which together with the rolling body holding elements 52 is formed as a single piece of injection-molded plastic. This can be seen well in the cross section of FIG. 8.

The connection element 55 furthermore serves as a fastening element, which can be used for the fastening in a form-fit element 532 in the form of a corresponding recess or indentation in the transfer element 53 by form fit. The holding action can be provided by locking elements (not shown), static friction, or additionally or alternatively by gluing or ultrasound welding. The arrangement in the assembled state can be seen in FIGS. 8 and 9, the longitudinal section B-B in FIG. 9 showing the form-fitting engagement of the connection element 55 in the form-fit element 532. In this way, the transfer element 53 is held securely in position on the rolling body cage 5.

Figure 10:
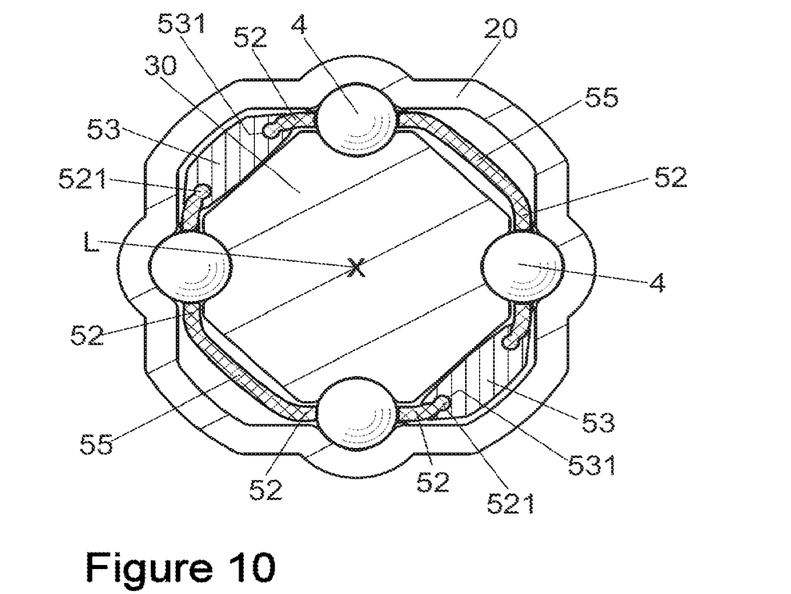
FIG. 10 is a cross-sectional view of still another example steering shaft.

FIG. 10 shows in a cross section view like FIGS. 4 and 7 a third embodiment. Here, in each case two rolling body holding elements 52 are joined together as a single piece by a connection element 55, preferably in the form of an injection-molded plastic part. The two rolling body holding elements 52 are joined together to form an overall sleeve-shaped rolling body cage 5 by means of two transfer elements 53, which may be configured the same way as in the embodiment of FIG. 4. Corresponding form-fit elements 521, 531 can likewise be provided for the connection.

Figure 11:
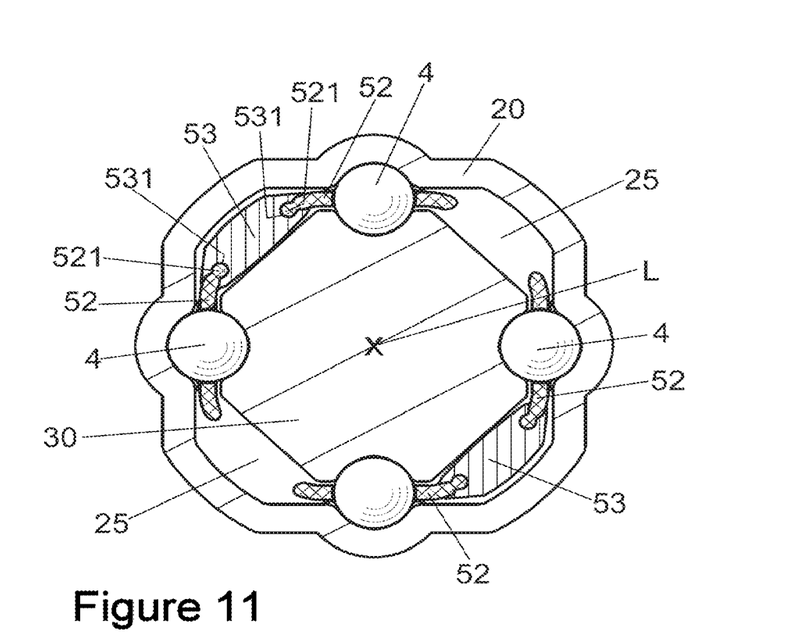
FIG. 11 is a cross-sectional view of yet another example steering shaft.

A further possible embodiment is shown likewise in cross section in FIG. 11. Here, in each case two individual, separate rolling body holding elements 52, which may be designed similar to FIG. 4, are joined together across a transfer element 53, which can be designed similar to FIG. 10 or 4. Contrary to the preceding embodiments, the rolling body cage 5 is not a single closed piece in the form of a sleeve, but rather is divided into two in the area 25 of the gap in the longitudinal direction. This produces a segmented design, making possible a radial mounting on the inner shaft 30.

Figure 12:
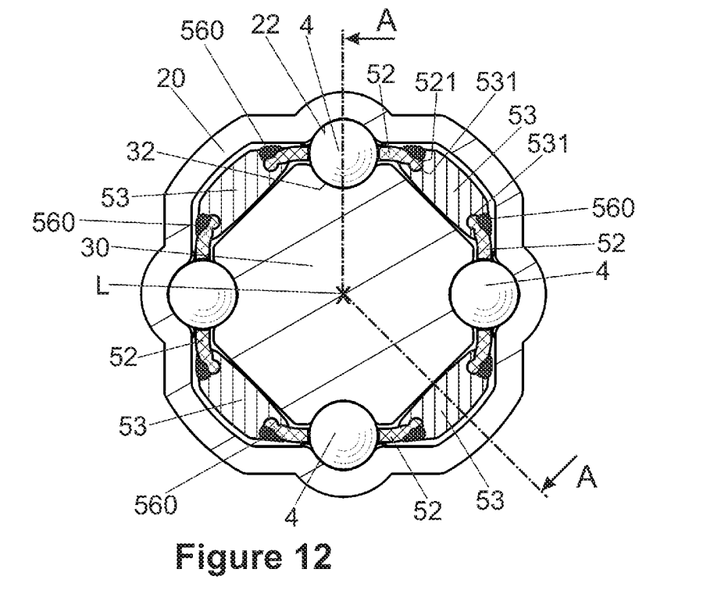
FIG. 12 is a cross-sectional view of another example steering shaft where a transfer element and a rolling body holding element are joined together by material bonding.
Figure 13:
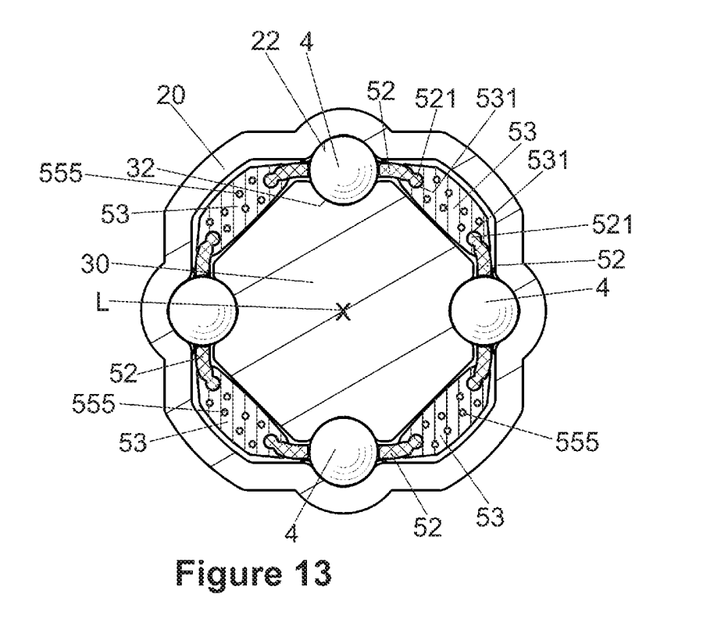
FIG. 13 is a cross-sectional view of an example steering shaft where a transfer element includes a reinforcement element.

FIG. 12 shows another embodiment, similar to that shown in FIG. 4, but with the rolling body holding elements 52 and the transfer elements 53 being joined together by material bonding 560, in this example, a braze connection. FIG. 13 shows still another example variant where the transfer elements 53 include reinforcement elements 555 that strengthen the dimensional rigidity of the transfer elements.

It can be seen with the aid of the different embodiments according to FIGS. 4, 7, and 10-13 that the combination according to the invention of rolling body holding elements 52 and transfer elements 53 makes possible a flexible adapting to different requirements.

LIST OF REFERENCE NUMBERS

1 Steering shaft
20 Hollow shaft
21 Fork
22 Groove
24 Stop element
25 Gap
30 Inner shaft
31 Fork
32 Groove
33 End
34 Stop element
4 Ball
41 Row of balls
5 Rolling body cage
51 Rolling body holder
52 Rolling body holding element
521 Form-fit element
53 Transfer element
531 Form-fit element 532 Form-fit element
54 Support surface
55 Connection element
L Longitudinal axis
F Pull-out force
555 Reinforcement elements
560 Material bonding

The invention claimed is:

1. A steering shaft for a motor vehicle comprising:
an inner shaft;
a hollow shaft in which the inner shaft is disposed telescopically coaxially in an axial direction; and
a rolling body held in a form-fit manner in a circumferential direction and configured to roll in the axial direction in a rolling body holding element of a rolling body cage that is configured to move axially with and to a same axial extent as the rolling body, the rolling body cage being disposed between the inner shaft and the hollow shaft, which rolling body cage is disposed in the axial direction between radially projecting stop elements of the hollow shaft and radially projecting stop elements of the inner shaft, wherein the rolling body cage includes end-face axial support surfaces that are oriented in the axial direction against the radially projecting stop elements, wherein the rolling body cage includes a transfer element that extends from a first of the end-face axial support surfaces to a second of the end-face axial support surfaces.

2. The steering shaft of claim 1 wherein the transfer element is at least one of harder, more rigid, or stronger than the rolling body holding element.

3. The steering shaft of claim 1 wherein the transfer element is comprised at least partially of a material that is at least one of harder, more rigid, or stronger than a material of the rolling body holding element.

4. The steering shaft of claim 3 wherein the material of the transfer element is metallic.

5. The steering shaft of claim 1 wherein the rolling body holding element is an injection-molded plastic part.

6. The steering shaft of claim 1 wherein the transfer element and the rolling body holding element are joined together by at least one of form fit or force locking.

7. The steering shaft of claim 1 wherein the transfer element comprises a reinforcement element.

8. The steering shaft of claim 1 wherein the transfer element is one of a plurality of transfer elements of the rolling body cage.

9. The steering shaft of claim 1 wherein the rolling body cage is sleeve shaped.

10. The steering shaft of claim 1 wherein the rolling body is a first of a plurality of rolling bodies that are held in a form-fit manner in the circumferential direction and configured to roll in the axial direction in the rolling body holding element of the rolling body cage.

11. The steering shaft of claim 10 wherein the transfer element is one of at least four transfer elements of the rolling body cage, wherein the rolling bodies are arranged in axial rows along the rolling body cage, wherein each of the transfer elements is disposed circumferentially between each axial row of the rolling bodies.

12. The steering shaft of claim 10 wherein the transfer element is one of a plurality of transfer elements of the rolling body cage, wherein the rolling bodies are arranged in axial rows along the rolling body cage, wherein in the circumferential direction a single one of the axial rows of the rolling bodies is disposed between each successive transfer element.

13. The steering shaft of claim 10 wherein the transfer element is configured to come into direct contact with the radially projecting stop elements of the inner shaft.

14. A steering shaft for a motor vehicle comprising:
an inner shaft;
a hollow shaft in which the inner shaft is disposed telescopically coaxially in an axial direction; and
a rolling body held in a form-fit manner in a circumferential direction and configured to roll in the axial direction in a rolling body holding element of a rolling body cage disposed between the inner shaft and the hollow shaft, which rolling body cage is disposed in the axial direction between radially projecting stop elements of the hollow shaft and radially projecting stop elements of the inner shaft, wherein the rolling body cage includes end-face axial support surfaces that are oriented in the axial direction against the radially projecting stop elements, wherein the rolling body cage includes a transfer element extending axially between the end-face axial support surfaces, wherein a material of the transfer element is at least one of harder or stronger than a material of the rolling body holding element.

15. The steering shaft of claim 14 wherein the transfer element extends completely from a first of the end-face axial support surfaces to a second of the end-face axial support surfaces.

16. The steering shaft of claim 14 wherein the transfer element is configured to come into direct contact with the radially projecting stop elements of the inner shaft.

* * * * *

UNITED STATES PATENT AND TRADEMARK OFFICE
CERTIFICATE OF CORRECTION

PATENT NO. : 11,472,466 B2
APPLICATION NO. : 16/615896
DATED : October 18, 2022
INVENTOR(S) : René Marco Schmidt It is certified that error appears in the above-identified patent and that said Letters Patent is hereby corrected as shown below:

On the Title Page

Item [71], In the section for "Applicants", the country of the first Applicant, THYSSENKRUPP PRESTA AG delete "Eschen (FINLAND)" and insert --Eschen (LIECHTENSTEIN)--.

Signed and Sealed this
Fifteenth Day of August, 2023

Katherine Kelly Vidal
*Director of the United States Patent and Trademark Office*